US011410203B1

(12) United States Patent
Haque et al.

(10) Patent No.: US 11,410,203 B1
(45) Date of Patent: Aug. 9, 2022

(54) OPTIMIZED MANAGEMENT OF ONLINE ADVERTISING AUCTIONS

(71) Applicant: Amazon Technologies, Inc., Seattle, WA (US)

(72) Inventors: Ehtesham Sam Haque, Bothell, WA (US); Han Wu, Redmond, WA (US); Kimberly Michele Wike, Lynnwood, WA (US); Rohan Gurappagouda Patil, Seattle, WA (US); Purak Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/089,576

(22) Filed: Nov. 4, 2020

(51) Int. Cl.
*G06Q 30/02* (2012.01)
*G06Q 30/08* (2012.01)
(Continued)

(52) U.S. Cl.
CPC ..... *G06Q 30/0275* (2013.01); *G06F 16/9538* (2019.01); *G06N 20/00* (2019.01); *G06Q 10/04* (2013.01); *G06Q 10/067* (2013.01); *G06Q 30/016* (2013.01); *G06Q 30/0201* (2013.01); *G06Q 30/0246* (2013.01); *G06Q 30/0256* (2013.01); *G06Q 30/0263* (2013.01); *G06Q 30/0264* (2013.01); *G06Q 30/08* (2013.01); *G06F 3/0482* (2013.01)

(58) Field of Classification Search
CPC ...................................................... G06Q 30/02
See application file for complete search history.

(56) References Cited

U.S. PATENT DOCUMENTS 7,974,989 B2    7/2011   Aronowich et al.
8,135,626 B2    3/2012   Das et al.
(Continued)

FOREIGN PATENT DOCUMENTS

WO    WO 2010/045376 A1 *    4/2010   ............. G06Q 40/00

OTHER PUBLICATIONS

Patrick Hummel; Uri Nadav, Setting Allocations and Prices in Auctions (English (United states)), The IP.com Prior Art Database, Oct. 29, 2017 (Year: 2017).*

(Continued)

*Primary Examiner* — Marilyn G Macasiano
(74) *Attorney, Agent, or Firm* — Robert C. Kowert; Kowert, Hood, Munyon, Rankin & Goetzel, P.C.

(57) ABSTRACT

Methods, systems, and computer-readable media for optimized management of online advertising auctions are disclosed. An auction management system sends bids for one or more bidding units (e.g., keywords or product identifiers) to an advertising vendor. A bid comprises a value per click associated with one or more search results pages or web pages for one or more search terms. At least a portion of the bids represent winning bids in one or more auctions for the one or more bidding units. The system determines success metrics associated with the bids based (at least in part) on user traffic for links associated with the winning bids. The system determines an optimal bid for a particular bidding unit based (at least in part) on the success metrics. The system sends the optimal bid for the particular bidding unit to the advertising vendor for an additional auction.

20 Claims, 10 Drawing Sheets

(51) Int. Cl.
  *G06Q 10/04* (2012.01)
  *G06Q 10/06* (2012.01)
  *G06Q 30/00* (2012.01)
  *G06F 16/9538* (2019.01)
  *G06N 20/00* (2019.01)
  *G06F 3/0482* (2013.01)

(56) References Cited

U.S. PATENT DOCUMENTS

| | | |
|---|---|---|
| 8,271,325 B2 | 9/2012 | Silverman et al. |
| 8,374,912 B2 | 2/2013 | Paroz et al. |
| 8,667,137 B2 | 3/2014 | Kokusho et al. |
| 8,898,071 B2 | 11/2014 | Poirier et al. |
| 8,983,860 B1 | 3/2015 | Beda, III et al. |
| 9,129,312 B1* | 9/2015 | Scholl ................. G06Q 30/0275 |
| 9,165,266 B2 | 10/2015 | Boss et al. |
| 9,218,611 B1 | 12/2015 | Lei et al. |
| 9,460,466 B2* | 10/2016 | Vassilvitskii .......... G06Q 30/08 |
| 9,842,354 B2 | 12/2017 | Hughes et al. |
| 9,990,656 B2 | 6/2018 | Saifee et al. |
| 10,217,118 B2 | 2/2019 | Vassilvitskii et al. |
| 10,255,608 B2 | 4/2019 | Kulkarni et al. |
| 10,565,626 B2 | 2/2020 | Seljan et al. |
| 10,755,308 B2* | 8/2020 | Wilkens ............. G06Q 30/0275 |
| 10,769,676 B2 | 9/2020 | Bishop et al. |
| 2012/0036009 A1 | 2/2012 | Aronowich et al. |
| 2012/0226576 A1* | 9/2012 | Pence ..................... H04W 4/14 |
| | | 705/26.3 |
| 2015/0186927 A1 | 7/2015 | Chittilappilly et al. |

OTHER PUBLICATIONS

"Marin Software Enhances Cross-Channel Bidding to Drive Revenue Acquisition," marinsoftware.com, San Francisco, Oct. 2012, Source: https://www.marinsoftware.com/resources/news/marin-software-enhances-cross-channel-bidding-to-drive-revenue-acquisition, 2 pages.

* cited by examiner

OPTIMIZED MANAGEMENT OF ONLINE ADVERTISING AUCTIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

Figure 1A:
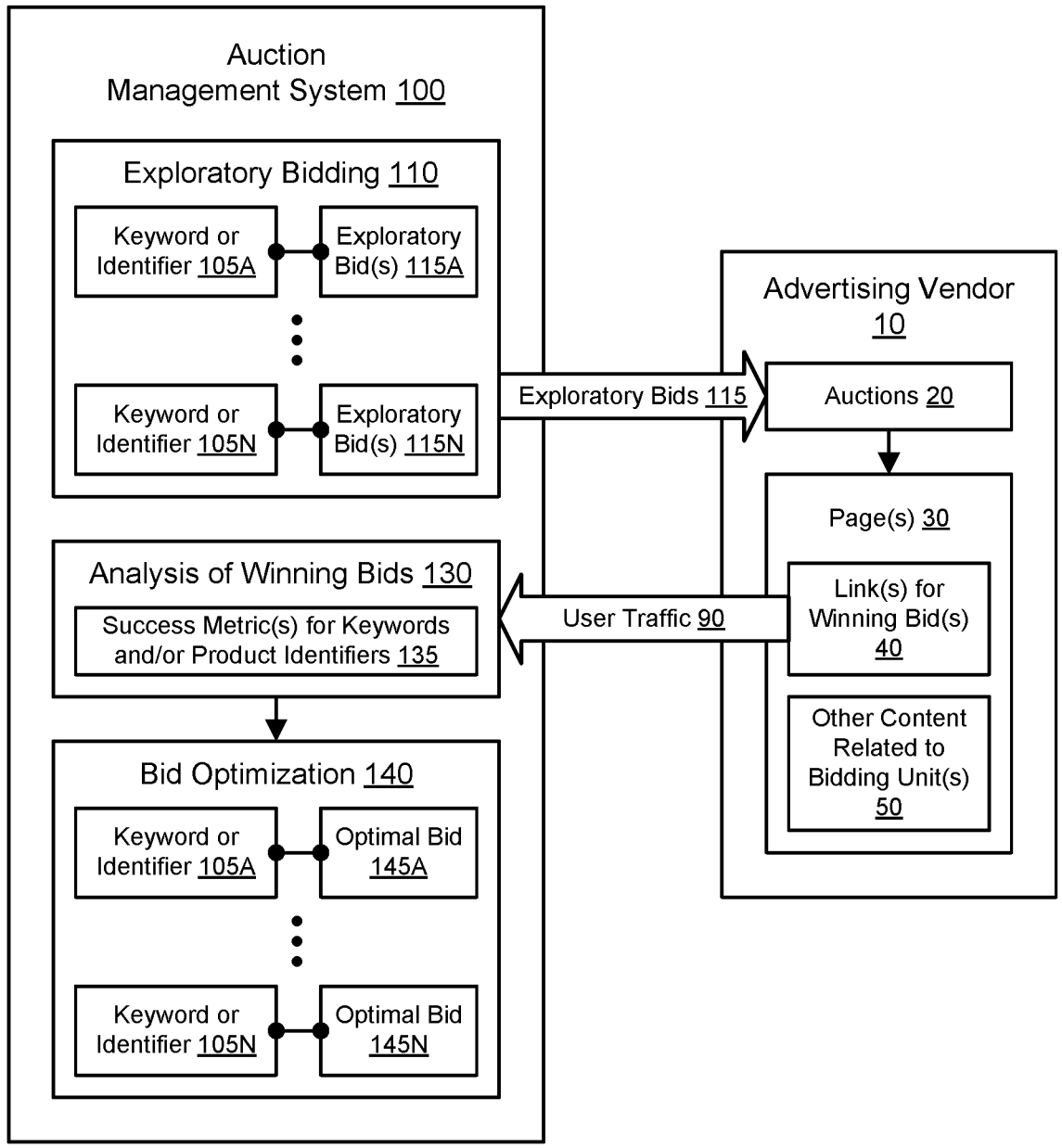
FIG. 1A and FIG. 1B illustrate an example system environment for optimized management of online advertising auctions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for optimized management of online advertising auctions are described. Internet-accessible search engines and other websites are an important way for advertisers to help customers find the products and services for which they are looking. An online store or merchant may seek to place advertisements for goods and services on search engine results pages (SERPs) and other pages generated by advertising vendors for relevant search terms provided by users. For example, if the online store sells smartphones, then the store may seek to have advertisements for those smartphones included with search results for search terms related to smartphones or in other pages related to smartphones. The advertisements can include links, and when users click on those links (e.g., in a web browser), the users can be taken to product pages for smartphones at the online store. Users may then choose to purchase the products. Similarly, advertisers may use advertisements on web pages to attract new subscribers to membership-based services (e.g., wedding registries, premium memberships at online stores, and so on).

Some keywords, key phrases, and product identifiers may be more valuable than others. Advertising vendors conduct auctions for bidding units (e.g., keywords, key phrases, and/or product identifiers) such that advertisements or other links for the winning bidder(s) are included in pages for the corresponding keyword(s), key phrase(s), and/or product identifiers. A bid may include a value such as a cost-per-click to be paid by the advertiser to the advertising vendor when a user clicks on the winning bidder's link. However, the auction process may be relatively opaque to bidders, and determining an optimal bid for a particular keyword or product identifier may be unduly time-consuming. An optimal bid may include a cost-per-click or other value per click that tends to win online advertising auctions while optimizing or otherwise improving one or more desired metrics of the bidder, e.g., return-on-investment (ROI) or other profit metrics, user engagement metrics, and so on. It may not feasible for larger advertisers to manually optimize bids for hundreds, thousands, or even millions of keywords, key phrases, and/or product identifiers.

The aforementioned challenges, among others, are addressed by embodiments of the techniques described herein, whereby an automated system determines optimal bids for auctions on bidding units at advertising vendors. Bids may be optimized to maximize or improve metrics or values such as return-on-investment (ROI) measurements, profit metrics, user engagement rates, click-through rates, conversion rates, and so on. An auction management system may automatically submit exploratory bids having different values per click for one or more bidding units to the advertising vendor and then determine the desired metric(s) for the winning bids, e.g., based (at least in part) on user traffic through links from SERPs or other pages. Using the metric(s) for the exploratory bids, the auction management system may automatically determine an optimal bid (e.g., an optimal cost-per-click) for a particular bidding unit, e.g., by selecting the bid with the best profit-per-click, return-on-investment metric, or other metric(s) sought to be optimized. The optimal bid may then be submitted to the advertising vendor with an expectation that the bid will win an auction for the particular bidding unit while also improving the relevant metric(s) (e.g., ROI) at the bidder.

To optimize bids for new keywords or key phrases without necessarily submitting exploratory bids, historical auction data from similar keywords or key phrases may be used to overcome the cold-start problem. Additionally, newer advertisers may obtain auction data for their keywords from a network-accessible store, e.g., from advertisers with more mature data sets for relevant bidding units. Optimal bids may be determined for particular times of day, times of the week, times of the month, times of year, and so on. Optimal bids may be determined for particular positions on SERPs when advertising vendors permit multiple winning bidders for a particular bidding unit. Keywords or keyword categories may be visualized using a graph with nodes and edges that represent relationships to customers, customer segments, metrics, and so on. Auctions may be simulated offline to guide an advertiser's investment strategy. Using one or more of these techniques, an automated system for online auction management may optimize, maximize, or otherwise improve metrics such as return-on-investment (ROI) measurements, profit metrics, user engagement rates, click-through rates, conversion rates, and so on. The auction management system may optimize bids for large numbers (e.g., thousands or millions) bidding units on behalf of a particular client.

As one skilled in the art will appreciate in light of this disclosure, embodiments may be capable of achieving certain technical advantages, including some or all of the following: (1) reducing the time required to converge on an optimal bid for a keyword, key phrase, or product identifier by using automated techniques to submit exploratory bids and analyze the impact of the bids on user traffic; (2) reducing the time required to converge on an optimal bid for a keyword, key phrase, or product identifier by using automated techniques to analyze the impact of historical bids on user traffic; (3) reducing the time required to refine an optimal bid for a keyword, key phrase, or product identifier by using automated techniques to collect feedback from user traffic associated with winning bids; (4) reducing the use of computing resources and network resources by applying auction data from known keywords and key phrases to new keywords and key phrases instead of submitting bids to an advertising vendor to generate auction data for the new keywords and key phrases; (5) reducing the use of computing resources and network resources by using an auction data store to copy auction data from one bidder to another bidder instead of submitting bids to an advertising vendor to generate new auction data; (6) improving the accuracy of bid optimization by optimizing bids for times of day, times of the week, times of the month, and times of year; (7) reducing the use of network resources by simulating auctions instead of submitting bids to an advertising vendor to generate auction data for the new keywords and key phrases; and so on.

Figure 1B:
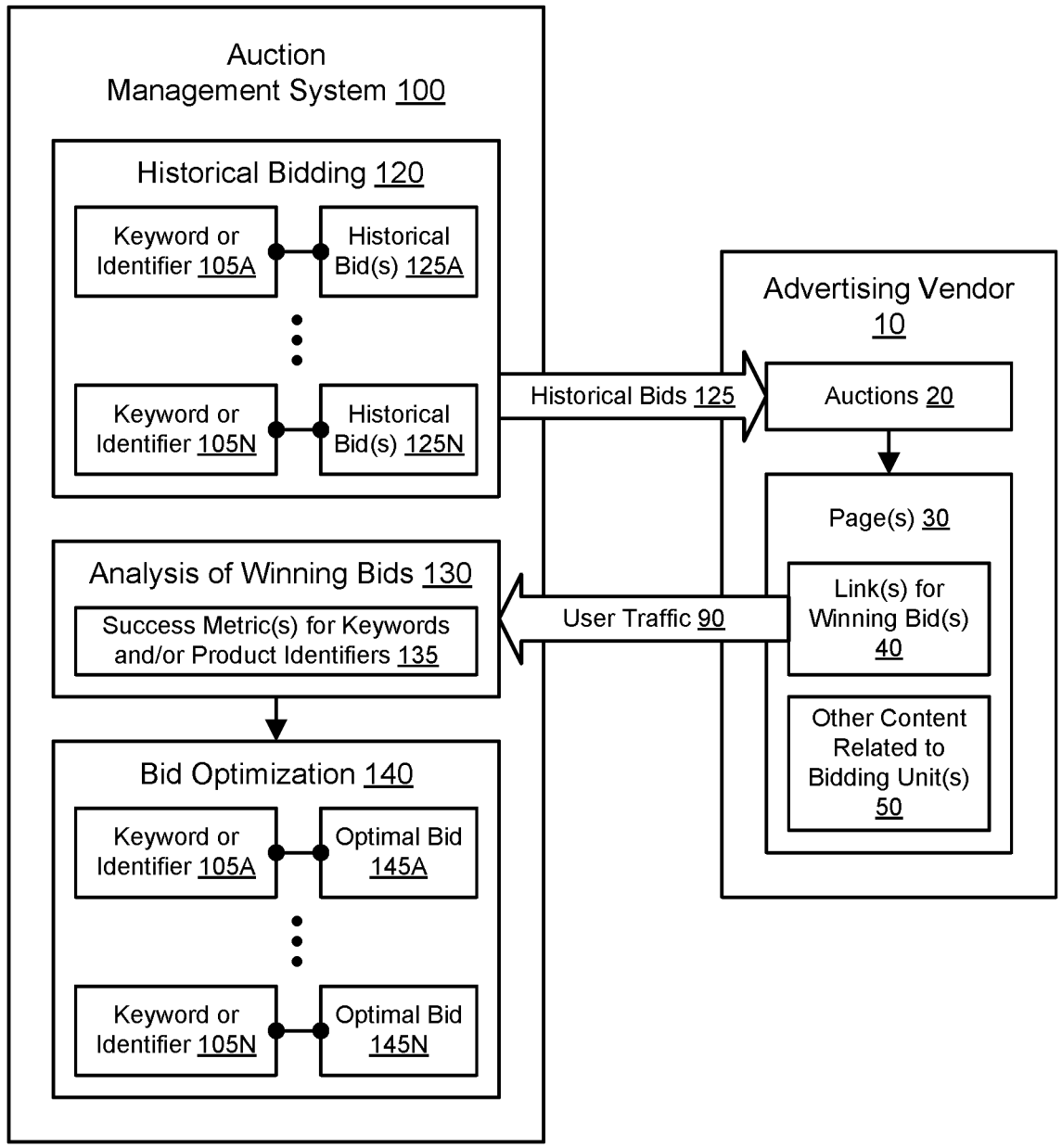

FIG. 1A and FIG. 1B illustrate an example system environment for optimized management of online advertising auctions, according to some embodiments. An auction management system 100 may optimize bids on online auctions 20 for bidding units (e.g., keywords, key phrases, and/or product identifiers) as conducted by an advertising vendor 10. The advertising vendor 10 may generate one or more search engine results pages (SERPs) or other web pages 30 for one or more bidding units such as keywords (or key phrases) or product identifiers 105A-105N. For example, when a user provides a search term such as "smartphone," the advertising vendor 10 may generate a SERP that includes content 50 related to the keyword "smartphone." Clients of the system 100 may include advertisers who wish to drive traffic to websites or other Internet-accessible locations via the page(s) 30. For example, an online store may seek to place advertisements for goods and services on page(s) 30 for keywords and/or key phrases relevant to those goods or services. The advertisements may include web or Internet links 40 for product pages at the online store, and when users click on those links (e.g., in a web browser), user traffic 90 may be generated such that the users are taken to the product pages. Users may then choose to purchase or lease the products or otherwise engage in transactions with the online store. Similarly, advertisements included in web pages may drive new subscribers to sign up for membership-based services (e.g., wedding registries, premium memberships at online stores, and so on).

As shown in the examples of FIG. 1A and FIG. 1B, the auction management system 100 may support keyword (or key phrase) or product identifier 105A through keyword (or key phrase) or product identifier 105N. The system 100 may manage optimized bidding for a large number (e.g., millions) of bidding units. A keyword may represent a single term related to goods, services, or other items that clients of the system 100 seek to advertise via SERPs 30. Example keywords may include generic product categories or descriptors such as "smartphone" as well as specific product names and identifiers. Similarly, a key phrase may represent a plurality of terms related to goods, services, or other items that clients of the system 100 seek to advertise via SERPs 30. For example, a key phrase may include terms such as "smartphone case" or "smartphone case rose gold." Product identifiers may include store-specific alphanumeric identifiers, UPC-based identifiers, manufacturer-issued product codes, and so on. The auction management system 100 may be used to optimize bids for keywords, key phrases, and/or product identifiers. The auction management system 100 may provide optimized bidding for a plurality of clients, e.g., advertisers. In some embodiments, one portion of the keywords (or key phrases) and/or product identifiers 105A-105N may be optimized on behalf of one particular client, and another portion of the keywords (or key phrases) and/or product identifiers 105A-105N may be optimized on behalf of another particular client. In some embodiments, a particular keyword, key phrase, or product identifier may be optimized on behalf of a plurality of clients.

The term "optimizing" may refer to a process of improving one or more metrics that are relevant to a client for keyword auctions 20 and the resulting user traffic 90. For example, values may be improved for return-on-investment (ROI) measurements, profit metrics, user engagement rates, click-through rates, conversion rates, and so on. A bid to the advertising vendor 10 may include an indication of a keyword (or key phrase) or product identifier along with a value, e.g., a cost-per-click or other user engagement value, to be paid by the winning bidder to the advertising vendor. The term "optimal bid" may refer to a bid for a particular keyword (or key phrase) or product identifier having a value (e.g., a cost-per-click) that is expected to win an auction while optimizing or otherwise improving one or more relevant metrics at the bidder. The relevant metrics may be referred to as success metrics and may quantify an impact of an advertising strategy. In some embodiments, the system 100 may perform bid optimization 140 based (at least in part) on analysis 130 of the results of exploratory bidding 110 and/or historical bidding 120 for various keywords and/or product identifiers 105A-105N.

As shown in the example of FIG. 1A, the auction management system 100 may include a component 110 for exploratory bidding. The exploratory bidding 110 may be implemented using an explore-exploit technique to collect auction data using a wide range of bids for bidding units lacking sufficient history (while exploiting known information for bidding units that do have sufficient history). By performing the exploratory bidding 110, the system 100 may automatically submit exploratory bids 115 to the advertising vendor 10. For a particular bidding unit, exploratory bids 115 may have different bid values (e.g., cost-per-clicks to be paid by advertisers to the advertising vendor 10). For example, the system 100 may submit exploratory bids 115A having a variety of cost-per-click values for a particular keyword (or key phrase) or product identifier 105A, and the system 100 may submit exploratory bids 115N having a variety of cost-per-click values for a particular keyword (or key phrase) or product identifier 105N. The values may be programmatically generated to reflect a wide range. The exploratory bids 115A or 115N may be submitted for one or more auctions 20 at one or more points in time. For example, if a new auction is conducted every day for a particular keyword (or key phrase) or product identifier 105A, then the system 100 may submit a different exploratory bid every day (potentially with different cost-per-click values) until sufficient results have been collected to perform bid optimization 140.

The advertising vendor 10 may conduct auctions 20 for various bidding units. The auctions 20 may be relatively opaque to bidders in that the type of auction may be unknown, the strategies and bids of other bidders may be unknown, and so on. If a bidder wins an auction, the advertising vendor 10 may generate at least a portion of one or more SERPs or other Internet-accessible pages 30 associated with the corresponding bidding unit, and the page(s) 30 may include one or more links 40 for one or more winning bids. A page 30 may be entirely generated by the advertising vendor 10 (e.g., a SERP generated by a search engine provider), or only a portion of a page 30 (e.g., advertisements associated with winning bids) may be generated by the advertising vendor. In some embodiments, a page 30 may include a plurality of different positions for advertisements or links associated with winning bids. The system 100 may receive, collect, or otherwise determine various types of auction data for winning bids, e.g., based (at least in part) on user traffic 90 for the bidder-specified link(s) 40. In some embodiments, the system 100 may implicitly determine losing bids by the absence of such auction data (e.g., no user traffic to specified link(s) 40).

The system 100 may include a component 130 to perform automated analysis of auction data for winning bids. The analysis 130 may determine one or more success metrics 135 that are relevant to a particular client, e.g., values that measure the impact of winning bids in light of the costs of the winning bids. A winning bidder may receive an impression from the advertising vendor 10 when the bidder's advertisement (including the link(s) 40) shows up on the resulting page 30. Impressions may be used to determine a win rate. User clicks on the link(s) 40 may result in user traffic 90 to a web page (or other Internet-accessible location) associated with the advertiser. User views of web pages (or other links) via user traffic 90 may be used to determine a click-through rate. User purchases of goods or services (or other transactions) via those web pages or links may be used to determine a conversion rate. In some embodiments, the analysis 130 may determine values for one or more success metrics 135 based (at least in part) on user engagement metrics such as click-through rates and conversion rates. The success metric(s) 135 may indicate an advertiser's return-on-investment for a particular keyword or key phrase. For example, the success metric(s) 135 may include profit-based metrics such as profit-per-click values for the advertiser's investment in a particular keyword or key phrase. A profit-per-click may be determined based (at least in part) on the advertiser's cost-per-click in comparison to revenue generated per click from user purchases. Success metric(s) 135 may also measure the impact of events such as new user subscriptions that are driven by winning bids. The types of success metric(s) 135 may represent default metrics and/or client-specified metrics that are relevant to the client's investment strategy in the auctions 20. In some embodiments, exploratory bidding may be performed repeatedly to refine the success metric(s) 135 over time, e.g., in response to changes in the auction landscape.

The system 100 may perform automated bid optimization 140 based (at least in part) on the analysis 130 of auction data for the winning bids. Bid optimization 140 may be performed for a large number of keywords, key phrases, and/or product identifiers. For example, the system 100 may determine an optimal bid 145A for keyword (or key phrase) or product identifier 105A and an optimal bid 145N for keyword (or key phrase) or product identifier 105N. An optimal bid may include an optimal cost-per-click to be paid by an advertiser to the advertising vendor 10. An optimal bid may be determined based (at least in part) on maximizing the profit-per-click for a bidding unit. In some embodiments, an optimal bid may be determined for a particular bidding unit by selecting, from the exploratory bids 115, the bid that produced the greatest profit-per-click. In some embodiments, an optimal bid may be determined for a particular bidding unit by applying a predictive model or other statistical methods to a plurality of the exploratory bids 115, such that the resulting optimal bid may not have been included in the exploratory bids. In some embodiments, exploratory bids 115 may represent a plurality of clients such that individual clients can leverage auction data from other clients. However, the system 100 may ensure privacy by using the auction data from exploratory bids 115 to train machine learning models (e.g., to predict optimal bids) and then discarding the client-specific data.

As shown in the example of FIG. 1B, the auction management system 100 may include a component 120 for historical bidding. Historical bidding 120 may include client-specified bid values (e.g., cost-per-click) rather than programmatically generated, arbitrary, and/or exploratory values. Historical bidding 120 may be performed or monitored over time to submit bids 125 to auctions 20 or to monitor the submission of such bids using the system 100. Historical bidding 120 may be used to collect data points about real-world auctions 20 that can be used for bid optimization 140 in the future. For a particular bidding unit, historical bids 125 may have different bid values (e.g., cost-per-clicks to be paid by advertisers to the advertising vendor 10). For example, the system 100 may submit or monitor historical bids 125A having a variety of cost-per-click values for a particular keyword (or key phrase) or product identifier 105A, and the system 100 may submit or monitor historical bids 125N having a variety of cost-per-click values for a particular keyword (or key phrase) or product identifier 105N. The historical bids 125A-125N may be submitted for one or more auctions 20 at one or more points in time.

As discussed above with respect to exploratory bidding 110, auction data may be collected for winning historical bids and used for analysis 130. The analysis 130 may determine one or more success metric(s) 135 associated with winning historical bids, e.g., profit-per-click metrics. Based (at least in part) on this analysis 130 and the resulting metric(s) 135, automated bid optimization 140 may be performed to determine optimal bids for a plurality of keywords or key phrases. In some embodiments, an optimal bid may be determined for a particular bidding unit by selecting, from the historical bids 125, the bid that produced the greatest profit-per-click. In some embodiments, an optimal bid may be determined for a particular bidding unit by applying a predictive model or other statistical methods to a plurality of the historical bids 125, such that the resulting optimal bid may not have been included in the historical bids. In some embodiments, historical bids 125 may represent a plurality of clients such that individual clients can leverage auction data from other clients. However, the system 100 may ensure privacy by using the auction data from historical bids 125 to train machine learning models (e.g., to predict optimal bids) and then discarding the client-specific data.

In some embodiments, search engine results pages 30 may include multiple slots for advertisements from winning bidders. The profit metric(s) for the different SERP positions may vary from position to position. For example, the first slot may go to the highest bidder and may tend to drive more user traffic, but the second slot may provide a better profit-per-click with a smaller bid (cost-per-click) while driving nearly the same amount of user traffic. Using the bid optimization 140, optimal bids may be determined for particular positions on pages 30 when advertising vendors permit multiple winning bidders for a particular key word or key phrase. In some embodiments, bid optimization 140 may divide the components of profit or ROI into individual components and learn the outcomes for different SERP positions. Based (at least in part) on auction data derived from exploratory bids, one or more machine learning models may be employed to learn various functions such as click-through rate and cost by SERP position. Once these functions have been determined, the bid optimization 140 may employ them to predict optimal bids for future scenarios.

In some embodiments, ROI optimization may be performed using a first step in which the ROI for keyword or key phrase k is determined as $\{profit-ad\_cost(pos(i))*win\_rate(pos(i))*ctr(pos(i))\}$, where profit is the profit made by selling a product, pos(i) is the ith position on the SERP as a result of a bid, ad_cost is the advertising cost charged by the paid search system, winrate is the probability of winning an auction (and getting an impression) given a bid, and ctr is the probability of users clicking on an advertisement given an impression. In a second step of ROI optimization, predictive functions may be learned for ad_cost, ctr, and win_rate based (at least in part) on the exploratory auction data. In a third step of ROI optimization, the optimal bid may be determined as bid=argmax (ROI_for_keyword_k). The optimal bid may represent the maximum return for a bidding unit.

In some embodiments, the system 100 may provide test capabilities for different keywords or product identifiers, different geolocations, different paid search systems, and other variables in the auction landscape. For example, the system 100 may implement a cluster-randomized control trail using clusters of keywords and products as the unit of randomization. These clusters may be formed by modeling the expected between-keyword network interference during experiment run, e.g., using historical search query reports from vendors to construct bipartite (search query—keyword/product) graphs and then randomizing on those for a keyword or product randomized test. Such a testing capability may permit clients to compare investment decisions and validate marketing assumptions in a cost-efficient manner.

In one embodiment, one or more components of the system 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the system 100. For example, the system 100 may be implemented using a service-oriented architecture in which various services perform complex tasks by sending requests and responses using service interfaces. The system 100 may offer one or more service interfaces by which clients may request bid optimization tasks. A service interface may be implemented as an application programming interface (API) or other programmatic interface. For example, a client of the system 100 may use an API to provide or select one or more keywords or key phrases for which automated bid optimization is sought. In some embodiments, a user interface (e.g., a graphical user interface) may be built on top of the API(s) or other programmatic interface(s) such that end users may invoke the functionality of the system 100, e.g., to view graph-based visualizations of auction data.

The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the system 100, may be offered to clients in exchange for fees.

Figure 9:
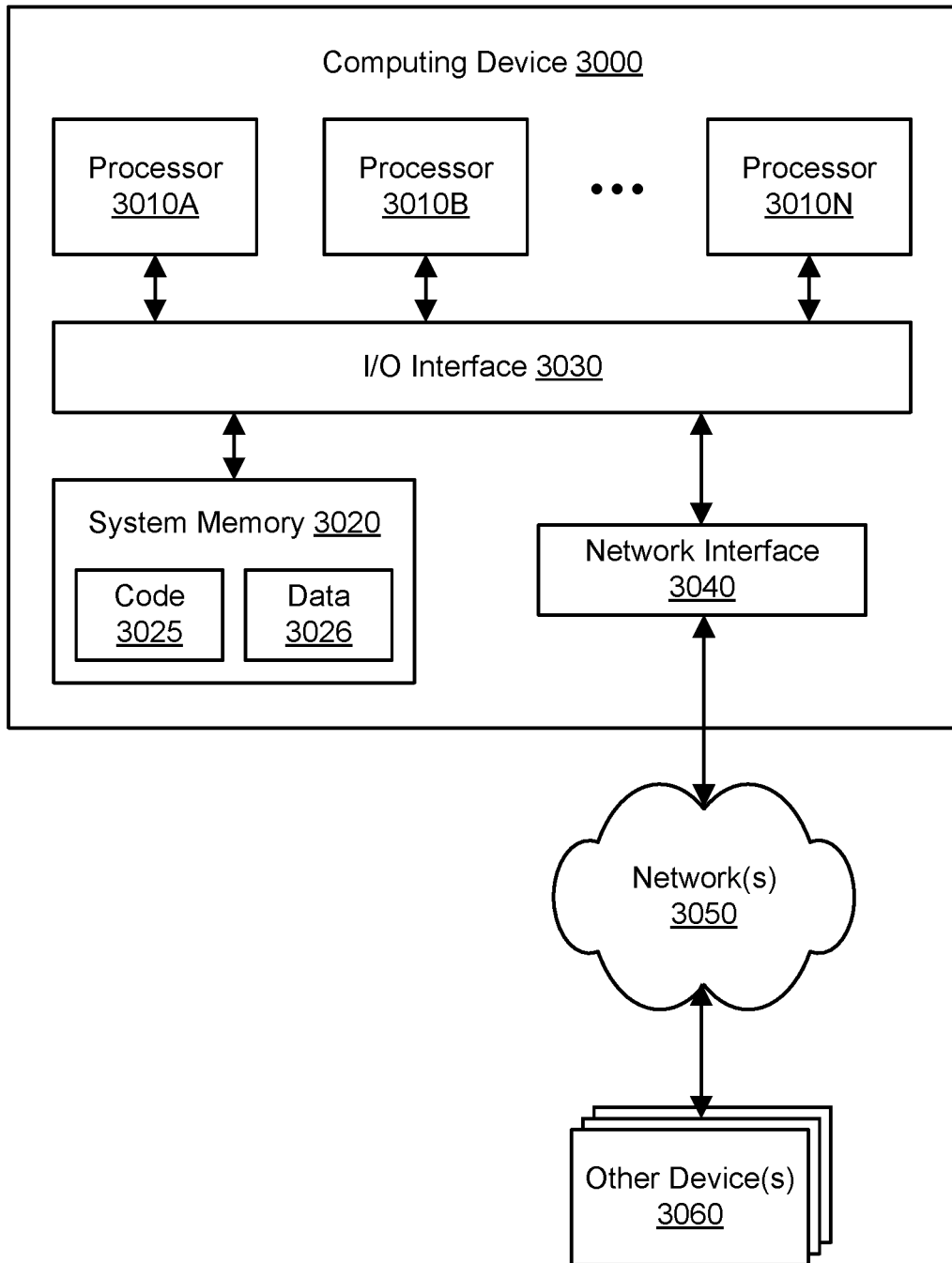
FIG. 9 illustrates an example computing device that may be used in some embodiments.

In various embodiments, components of the system 100 may be implemented using any suitable number and configuration of computing devices, any of which may be implemented by the example computing device 3000 illustrated in FIG. 9. In some embodiments, the computing devices may be located in any suitable number of data centers or geographical locations. In various embodiments, at least some of the functionality of the system 100 may be provided by the same computing device or by different computing devices. In various embodiments, if any of the components of the system 100 are implemented using different computing devices, then the components and their respective computing devices may be communicatively coupled, e.g., via one or more networks. Any of the components of the system 100 may represent any combination of software and hardware usable to perform their respective functions. In some embodiments, operations implemented by the system 100 may be performed automatically, e.g., without a need for user initiation or user intervention after an initial configuration stage, and/or programmatically, e.g., by execution of program instructions on at least one computing device. In some embodiments, the system 100 may include additional components not shown, fewer components than shown, or different combinations, configurations, or quantities of the components shown.

Clients of the system 100 may represent external devices, systems, or entities with respect to the system. Client devices may be managed or owned by one or more customers of the system 100. In one embodiment, the client devices may be implemented using any suitable number and configuration of computing devices, any of which may be implemented by the example computing device 3000 illustrated in FIG. 9. Clients may convey network-based service requests to the system 100 via one or more networks, e.g., to request optimization of bids for one or more keywords or key phrases. The network(s) may encompass any suitable combination of networking hardware and protocols necessary to establish network-based communications between client devices and the system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the system 100. In one embodiment, client devices may communicate with the system 100 using a private network rather than the public Internet. In various embodiments, the various components of the system 100 may also communicate with other components of the system using one or more network interconnects.

Figure 2:
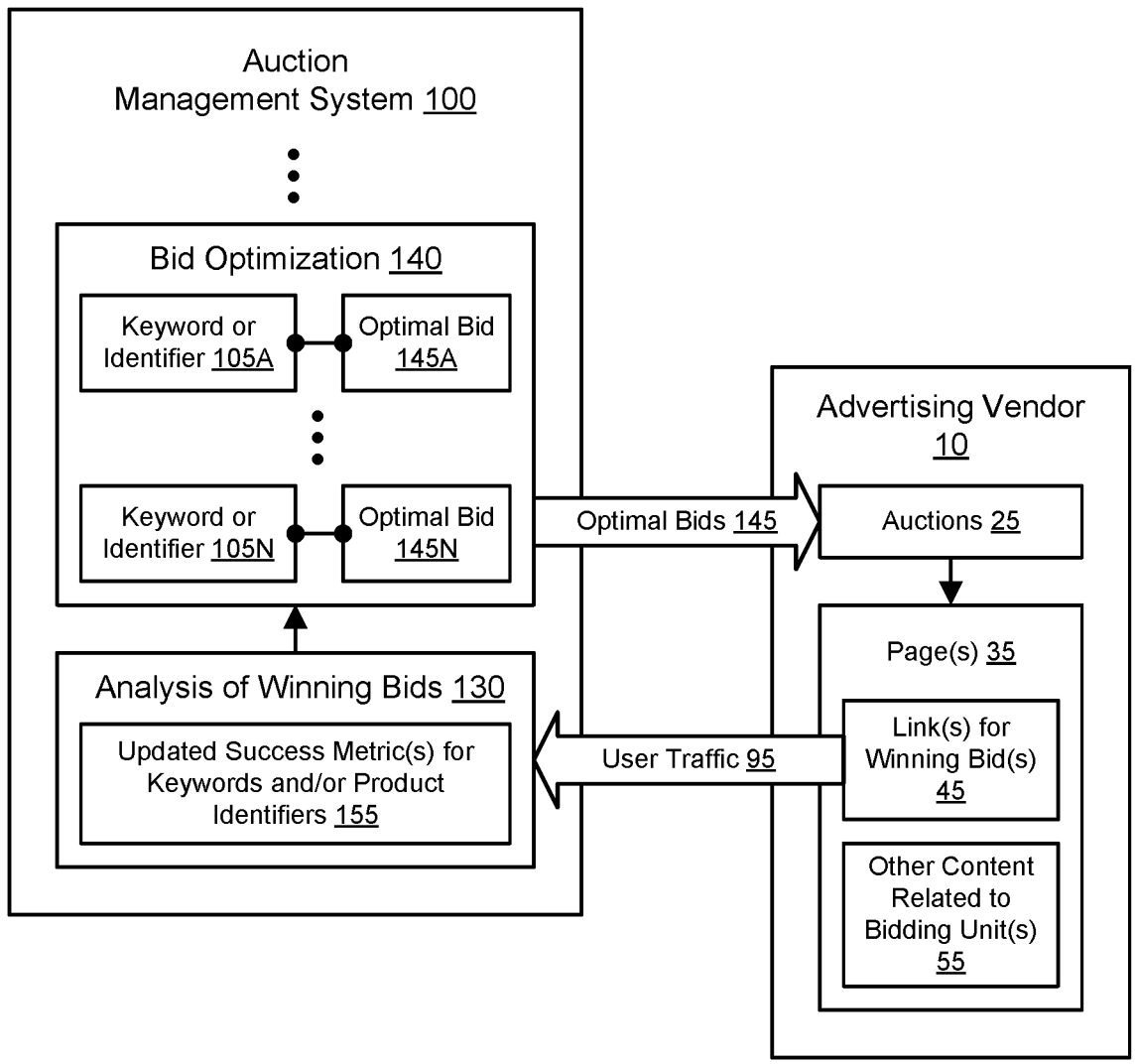
FIG. 2 illustrates further aspects of the example system environment for optimized management of online advertising auctions, including collecting feedback from an advertising vendor to update metrics usable for bid optimization, according to some embodiments.

FIG. 2 illustrates further aspects of the example system environment for optimized management of online advertising auctions, including collecting feedback from an advertising vendor to update metrics usable for bid optimization, according to some embodiments. For a particular bidding unit, the optimal bid may be submitted by the system 100 to the advertising vendor 10 with an expectation that the bid will win an auction for the particular bidding unit while also improving the success metric(s) (e.g., profit-per-click or ROI) at the bidder. Additional auctions 25 may be conducted using these optimal bids 45 (potentially along with bids from other advertisers). If a bidder wins an auction, the advertising vendor 10 may generate one or more pages 35 for the corresponding bidding unit that include one or more links 45 for one or more winning bids. For example, a SERP 35 may be generated in response to a user submitting search terms that include the keyword or key phrase. A page 35 may include other content 55 related to the bidding unit, e.g., other links and preview information for those links in a SERP. In some embodiments, a page 35 may include a plurality of different positions for advertisements or links associated with winning bids. The system 100 may receive, collect, or otherwise determine various types of auction data for winning bids, e.g., based (at least in part) on user traffic 95 for the bidder-specified link(s) 45. In some embodiments, the system 100 may implicitly determine losing bids by the absence of such auction data (e.g., no user traffic to specified link(s) 45).

As discussed above, the system 100 may include a component 130 to perform automated analysis of auction data for winning bids. Based (at least in part) on new user traffic 95, the analysis 130 may update one or more success metrics 135 that are relevant to a particular client. A winning bidder may receive an impression from the advertising vendor 10 when the bidder's advertisement (including the link(s) 45) shows up on the resulting SERP 35. Impressions may be used to determine an updated win rate. User clicks on the link(s) 45 may result in user traffic 95 to a web page (or other Internet-accessible location) associated with the advertiser. User views of web pages via user traffic 95 may be used to determine an updated click-through rate. User purchases of goods or services (or other transactions) via those web pages may be used to determine an updated conversion rate. The analysis 130 may update one or more success metrics 135 based (at least in part) on the updated user engagement metrics such as click-through rates and conversion rates. The updated success metric(s) 155 may indicate an advertiser's return-on-investment for a particular bidding unit. For example, the updated success metric(s) 155 may include profit-based metrics such as updated profit-per-click values for the advertiser's investment in a particular keyword or key phrase. A profit-per-click may be determined based (at least in part) on the advertiser's cost-per-click in comparison to revenue generated per click from user purchases. The updated success metric(s) 155 may represent default metrics and/or client-specified metrics that are relevant to the client's investment strategy in the auctions 25.

The system 100 may again perform automated bid optimization 140 based (at least in part) on the updated success metric(s) 155. By implementing the feedback loop shown in FIG. 2, the system may automatically update and refine the optimal bids 145A-145N over time. For example, if a previously determined optimal bid 145N ceases to win auctions for the corresponding keyword 105N, then the bid optimization 140 may automatically increase the bid amount or return to exploratory bidding. As another example, if the profit-per-click begins to drop for a particular bid amount, then the system 100 may lower the optimal bid to maintain profitability. The feedback loop shown in FIG. 2 may also permit clients to perform ad-hoc exploration of bid values and assess the impact of different investment strategies on success metric(s) 155.

Figure 3:
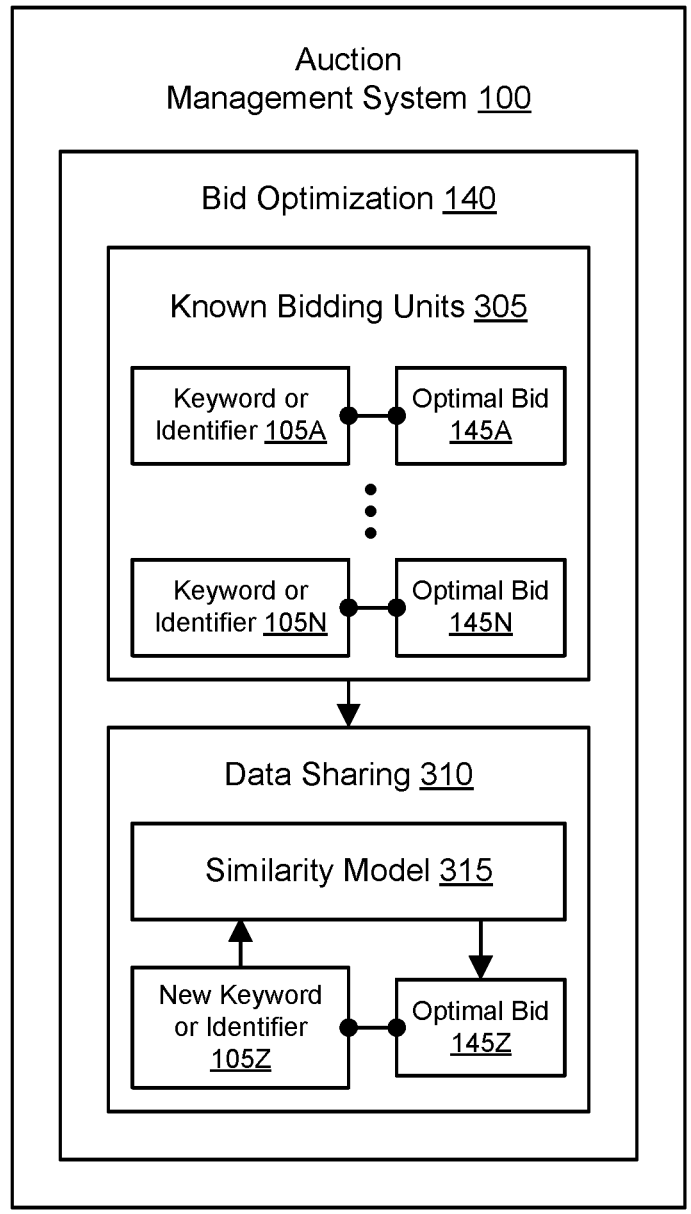
FIG. 3 illustrates further aspects of the example system environment for optimized management of online advertising auctions, including data sharing from known bidding units to address a cold-start problem for new bidding units, according to some embodiments.

FIG. 3 illustrates further aspects of the example system environment for optimized management of online advertising auctions, including data sharing from known bidding units to address a cold-start problem for new bidding units, according to some embodiments. In some embodiments, the system 100 may maintain auction data for a set of known bidding units 305. The auction data may include the known bidding units themselves along with one or more metrics, e.g., a profit-per-click and optimal cost-per-click. For example, using exploratory bidding 110 and/or historical bidding 120, the system 100 may have determined optimal bids 145A-145N for respective bidding units 105A-105N. If the system 100 is asked to optimize a bid for a new keyword (or key phrase) or product identifier 105Z for which no auction data has been collected, the system may use a data sharing component 310 to determine an optimal bid 145Z based (at least in part) on the auction data for the known bidding units 305. The data sharing 310 may be used instead of a more time-consuming and expensive exploratory bidding process 110 for the new bidding unit.

In some embodiments, the data sharing 310 may use a similarity model 315 to match the new keyword (or key phrase) or product identifier 105Z to one or more of the known bidding units 305. The data sharing 310 may then determine the optimal bid 145Z based (at least in part) on the previously determined optimal bid(s) for the similar bidding unit(s). The similarity model 315 may be implemented using machine learning techniques and may include a neural network model or other machine learning model. Machine learning techniques may be implemented using one or more systems that learn from data, identify patterns, and make predictions or other decisions with minimal human intervention (e.g., after human input during an initial configuration phase such as model training). Machine learning techniques may include generating and using one or more models that can programmatically output results (e.g., identification of entities and links to matching entities in databases) based (at least in part) on input (e.g., unstructured text documents and structured databases). A machine learning model may undergo a model training process (e.g., using a training data set) such that it learns patterns sufficient to make inferences about future events. A machine learning model may undergo a model evaluation process to assess the quality of the model's performance, e.g., after training.

One or more machine learning models may be trained to provide predictions of similar keywords, key phrases, or product identifiers (e.g., from the set 305) based (at least in part) on a new keyword (or key phrase) or product identifier 105Z that the model did not encounter during training. In some embodiments, a neural network model may be trained using customer interaction data for an online store. The customer interaction data may reflect customer interactions with search pages and product pages, e.g., to identify keywords, key phrases, and product identifiers that are similar to one another from customers' perspectives. By being trained on this interaction data, the neural network model may take into account the semantics of keywords and key phrases. For example, the model may differentiate between "smartphone rose gold" and "smartphone case rose gold" as referring to two categories of items—smartphones and cases for smartphones—that are sufficiently different that auction data for one may not be applicable to the other. As another example, the model may determine that "smartphone rose gold" and "smartphone space grey" are sufficiently similar to apply auction data from the known phrase to the newly encountered phrase. In some embodiments, keywords, key phrases, and product identifiers may be clustered based (at least in part) on semantic similarity and/or user interaction data.

Figure 4:
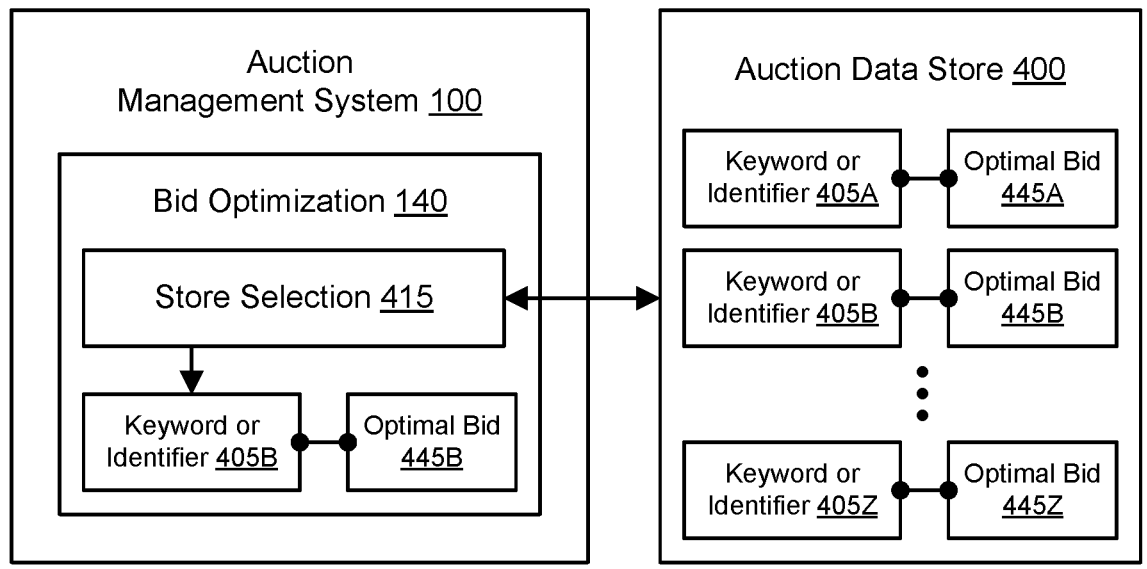
FIG. 4 illustrates further aspects of the example system environment for optimized management of online advertising auctions, including the use of a network-accessible store for auction data for bidding units, according to some embodiments.

FIG. 4 illustrates further aspects of the example system environment for optimized management of online advertising auctions, including the use of a network-accessible store for auction data for bidding units, according to some embodiments. To overcome the cold-start problem, newer advertisers who lack auction data for their bidding units may obtain auction data from a network-accessible store or online store 400. For example, advertisers with more mature auction data sets may list their auction data on the store 400 and may receive payment when their auction data is selected by other advertisers. In some embodiments, auction data may be listed on the store 400 only with the permission of advertisers for whom that data was generated. Advertisers may choose to list older data sets on the store 400 to give newer advertisers a starting point. As shown in FIG. 4, for example, the store 400 for auction data may include a keyword (or key phrase) or product identifier 405A and its optimal bid 445A, another keyword (or key phrase) or product identifier 405B and its optimal bid 445B, yet another keyword (or key phrase) or product identifier 405Z and its optimal bid 445Z, and so on. The optimal bids 445A-445Z may be determined by the system 100 using bid optimization 140.

The system 100 may include a component for store selection 415. The store selection 415 may include a user interface that permits users to browse the bidding units 405A-405Z in the store 400 and select one or more of them. On selection and payment, the purchaser may gain access to the corresponding optimal bid(s) and use the system 100 to automatically submit the optimal bid(s) on the purchaser's behalf. For example, instead of using a manual trial-and-error bidding process or using the system 100 to perform a time-consuming exploratory bidding 110 process, a new advertiser may select a particular keyword (or key phrase) or product identifier 405B from the store 400 and, within moments, be able to submit bids for that bidding unit using the optimal bid 445B retrieved from the store.

Figure 5:
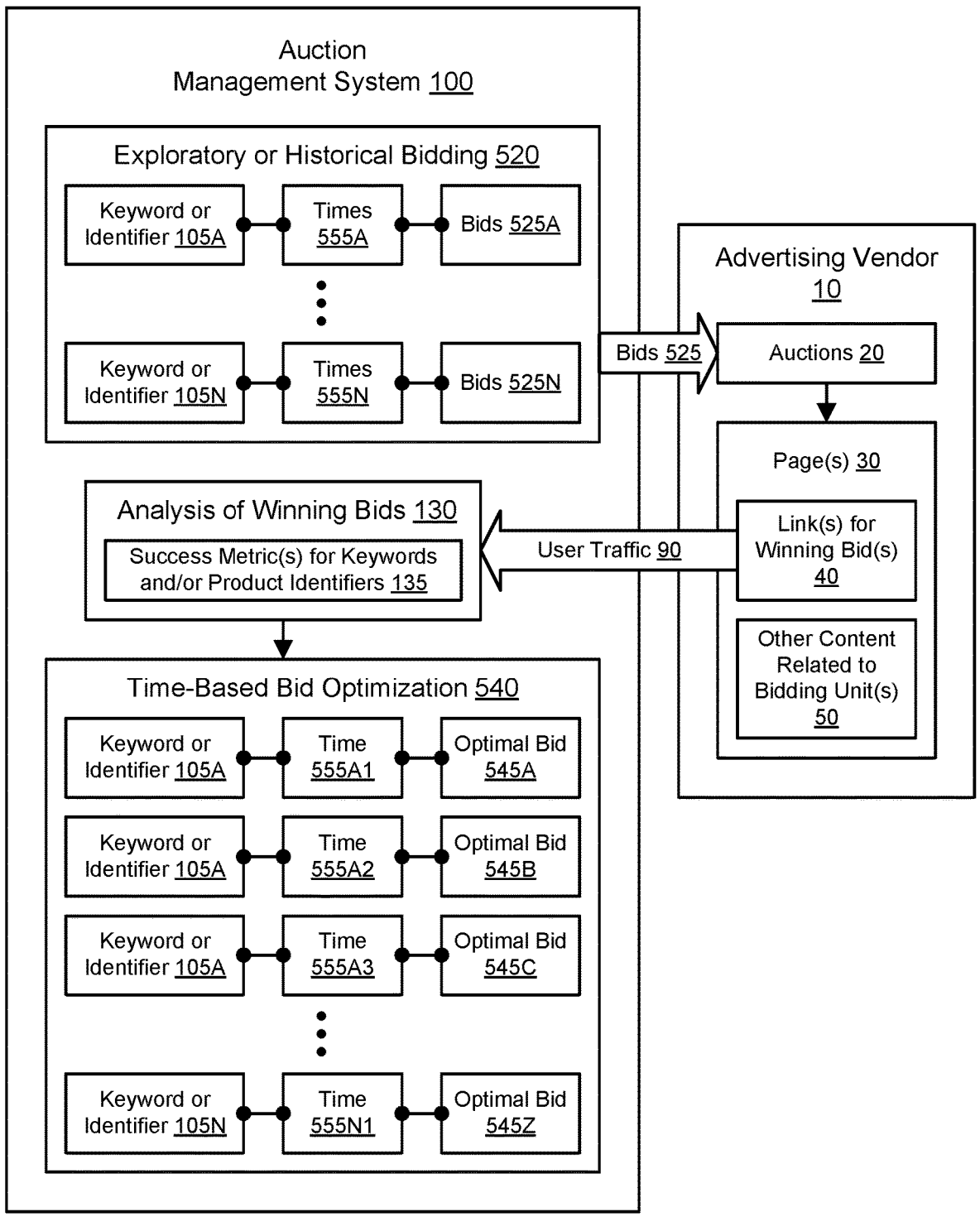
FIG. 5 illustrates further aspects of the example system environment for optimized management of online advertising auctions, including time-based optimization of bids for bidding units, according to some embodiments.

FIG. 5 illustrates further aspects of the example system environment for optimized management of online advertising auctions, including time-based optimization of bids for bidding units, according to some embodiments. As discussed above, some bidding units may be more valuable than others in terms of driving traffic to client websites or driving profits at those clients. Additionally, the value of bidding units may change over time in a predictable manner. For example, a bidding unit may often be more valuable at one time of day than at another time of day. As another example, a bidding unit may be more valuable at one day of the week or day of the month than at another day of the week or day of the month. As yet another example, a bidding unit may be more valuable at one time of year than at another time of year. To account for these changes in value, the system 100 may perform time-based bid optimization 540. As discussed above, the system 100 may perform exploratory bidding or historical bidding 520 to submit a variety of bids 525 to an advertising vendor 10. The bidding 520 may track the times at which bids 525 are submitted. For example, bids 525A may be submitted for keyword (or key phrase) or product identifier 105A at a variety of different times 555A, and bids 525N may be submitted for keyword (or key phrase) or product identifier 105N at a variety of different times 555N. The different times 555A-555N may include different hours in one day, different days of the week, different days of the month, different months or seasons, and so on.

Based (at least in part) on analysis 130 of auction data for winning bids at different times, the time-based bid optimization 540 may determine optimal bids for particular times of day, times of the week, times of the month, times of year, and so on. As shown in the example of FIG. 5, for the keyword (or key phrase) or product identifier 105A, the optimization 540 may determine one optimal bid 545A at one time 555A1, another optimal bid 545B at another time 555A2, yet another optimal bid 545C at yet another time 555A3, and so on. Similarly, the optimization 540 may determine time-based optimal bids for the keyword (or key phrase) or product identifier 105N, such as an optimal bid 545N at a particular time 555N1. The time-based optimal bids may be selected or determined to maximize a profit-per-click for different points in time (at which bids 525 are submitted) or periods of time (for which user traffic 90 is received). In some embodiments, the time-based optimal bids may be determined using a predictive model (e.g., a machine learning model) that accounts for forecasted changes in winning bids or other metric(s) 135 at different points in time. In some embodiments, time-based bid optimization 540 may determine bid modifiers for bidding units to account for changes in time of day, seasonality, and so on. The bid modifiers may represent scaling factors to increase or decreases a default bid. In some embodiments, seasonal or time-based behavior may be identified for categories of keywords, key phrases, or product identifiers.

Figure 6:
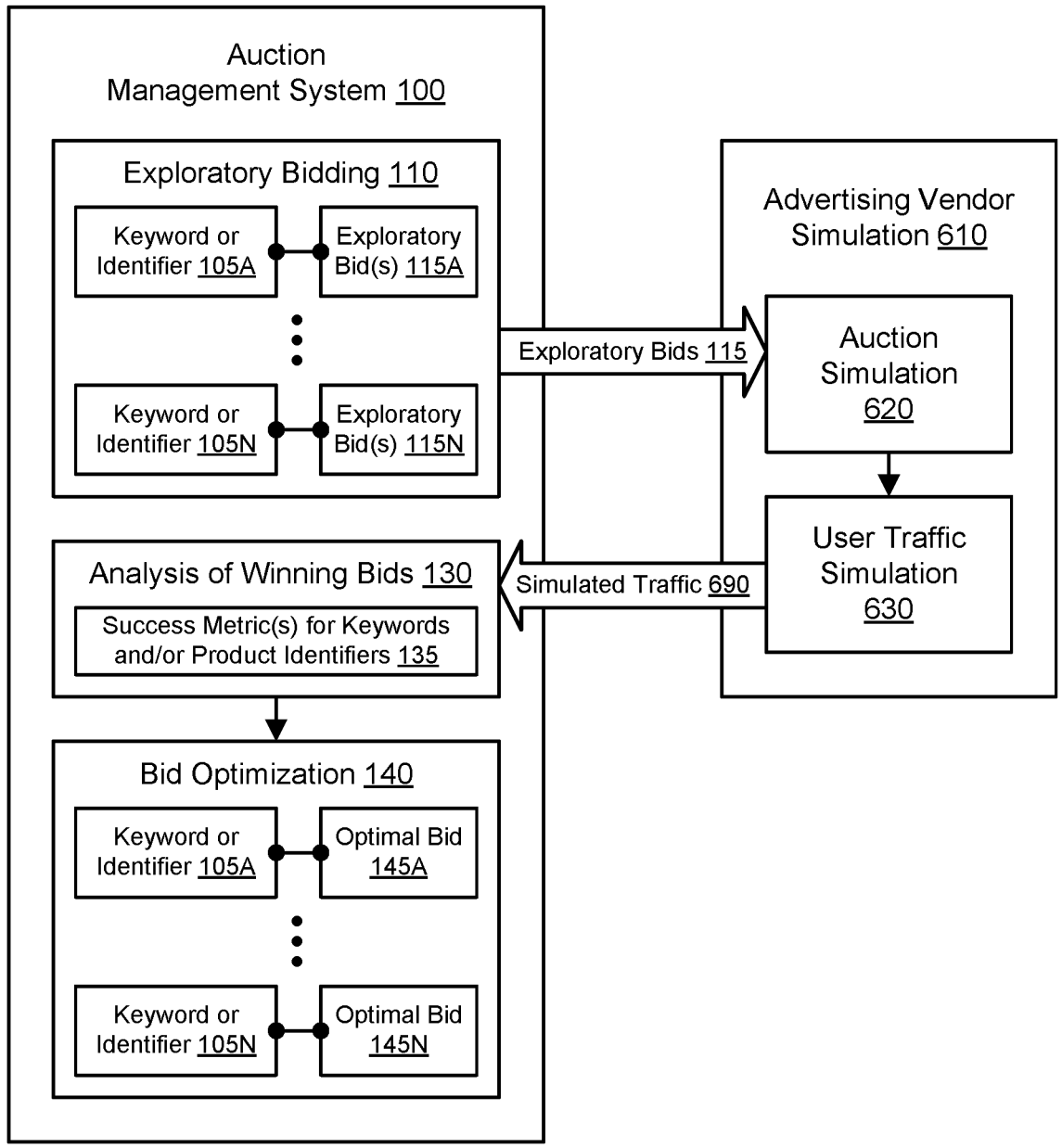
FIG. 6 illustrates further aspects of the example system environment for optimized management of online advertising auctions, including simulation of auctions at an advertising vendor, according to some embodiments.

FIG. 6 illustrates further aspects of the example system environment for optimized management of online advertising auctions, including simulation of auctions at an advertising vendor, according to some embodiments. Auctions may be simulated rather than conducted online to guide an advertiser's investment strategy without necessarily incurring the real-world costs of winning auctions. As shown in FIG. 6, the system 100 may submit bids 115 to a simulation 610 of the advertising vendor 10 instead of to the advertising vendor itself. The advertising vendor simulation 610 may perform simulation 620 of one or more auctions 620 for bidding units. The simulated auction(s) 620 may be implemented using historical auction data for the bidding units 105A-105N. The simulated auction(s) 620 may tend to produce the same outputs (winners) for the same inputs (bids) as the real-world auction(s) 20. Based (at least in part) on the winner(s) of the simulated auction(s) 620, the advertising vendor simulation 610 may use a component for user traffic simulation 630 to generate simulated traffic 690. As discussed above, the system 100 may perform automated analysis 130 of the auction data generated by the winning bid(s) in the simulated auction(s) 620, e.g., as determined using the simulated traffic 690. Bid optimization 140 may be performed using output of the analysis 130.

In some embodiments, the simulation 610 may be performed using one or more predictive models of the auction environment. For example, the system 100 may build models for auction win rate (for simulated auctions 620), click-through rate (for traffic simulation 630), and cost as functions of bid. These models may be used to predict success metrics 135 for particular bids and select the bid with the maximum expected return. The use of the simulation 610 may reduce network usage and also save the cost of paying the cost-per-clicks for winning bids. Due to the relatively low cost of the simulation 610, bids 115 may be submitted, refined, and submitted again in order to converge on an optimal bid. The simulation 610 may permit advertisers to measure the incrementality of their investments and to make causal inferences about changes to investment strategies.

Figure 7:
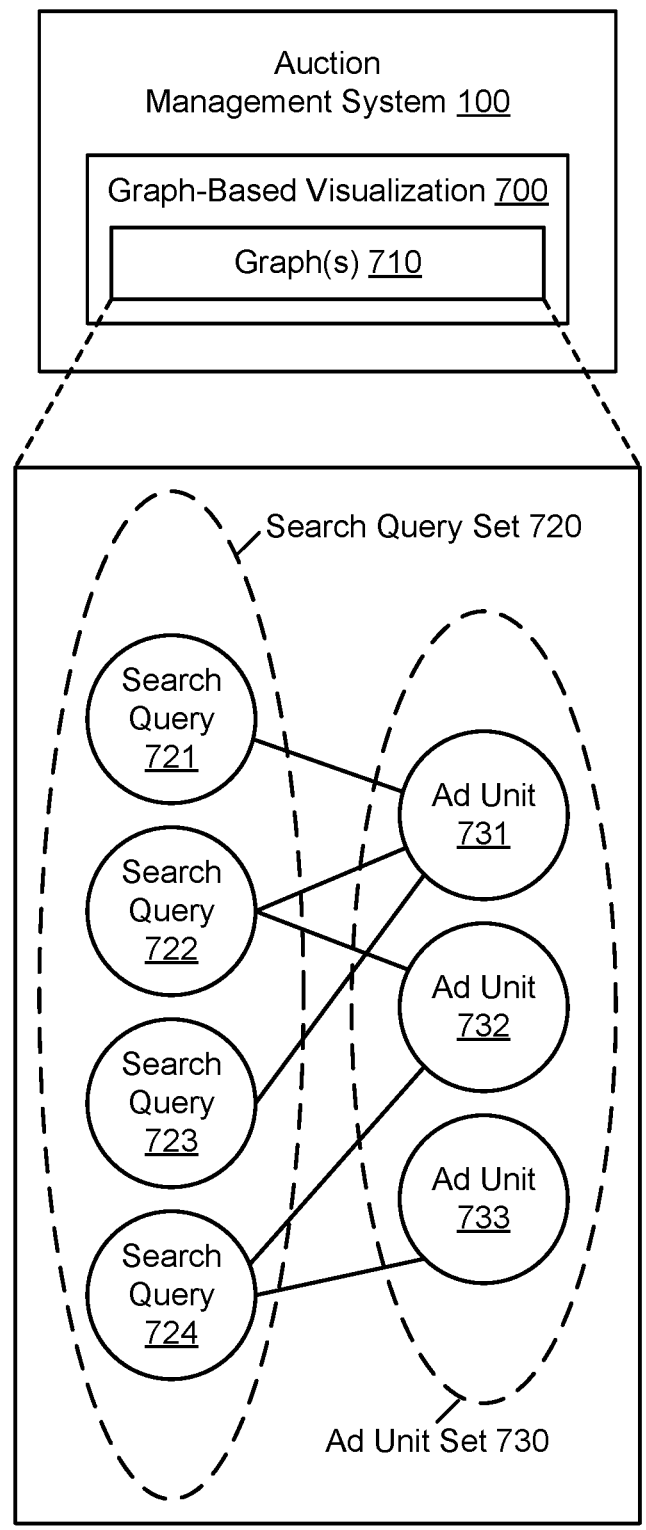
FIG. 7 illustrates further aspects of the example system environment for optimized management of online advertising auctions, including graph-based visualization of bids for keywords and key phrases, according to some embodiments.

FIG. 7 illustrates further aspects of the example system environment for optimized management of online advertising auctions, including graph-based visualization of bids for keywords and key phrases, according to some embodiments. The system 100 may include a graph-based visualization component 700 as part of a graphical user interface (GUI). The visualization component 700 may display graph-based visualizations (graphs) of bidding units and related data. For example, keywords (or product identifiers) or keyword categories (or product categories) may be visualized using a graph with nodes and edges that represent relationships to customers, customer segments, metrics, and so on. In some embodiments, a graph 710 may include one or more vertices representing bidding units. In some embodiments, the graph 710 may include one or more vertices representing individual customers or customer segments. In some embodiments, the graph 710 may include one or more vertices representing product identifiers or product categories. Edges between these vertices may represent interactions or relationships.

Graph-based visualizations may visually indicate patterns, trends, and interactions between bidding units and bidding unit categories, customers and customer segments, and various metrics (e.g., engagement metrics such as click-through rate, conversion rate, profit-per-click, and so on). For example, the graph 710 may show which keyword categories connect to which customer segments while overlaying relevant metrics. As shown in the example of FIG. 7, a graph 710 may depict a search query set 720 that includes nodes representing different search queries (e.g., keywords or key phrases) 721, 722, 723, and 724. The example graph 710 may also depict an ad unit set 730 that includes nodes representing different ad units (e.g., customer segments) 731, 732, and 733. Edges between the various vertices may represent metrics for customer segments that responded to ads for particular bidding units. For example, an edge may represent a conversion rate, profit metric, or click-through rate. In some embodiments, a user may select which metric to depict in a graph 700 at a given time. In some embodiments, the vertex and edge size may vary according to the strength of the metric. For a given bidding unit in the graph 710, information from neighbors may be pooled. In some embodiments, keyword categories or product categories may be represented using summary data or other aggregated data. As an individual keyword or product identifier accumulates significant history over time, the system 100 may automatically switch to using the individual keyword's or product's data through a statistical Bayesian technique. In some embodiments, users may zoom into the individual bidding unit level or zoom out to the category level in a graph 710.

Figure 8:
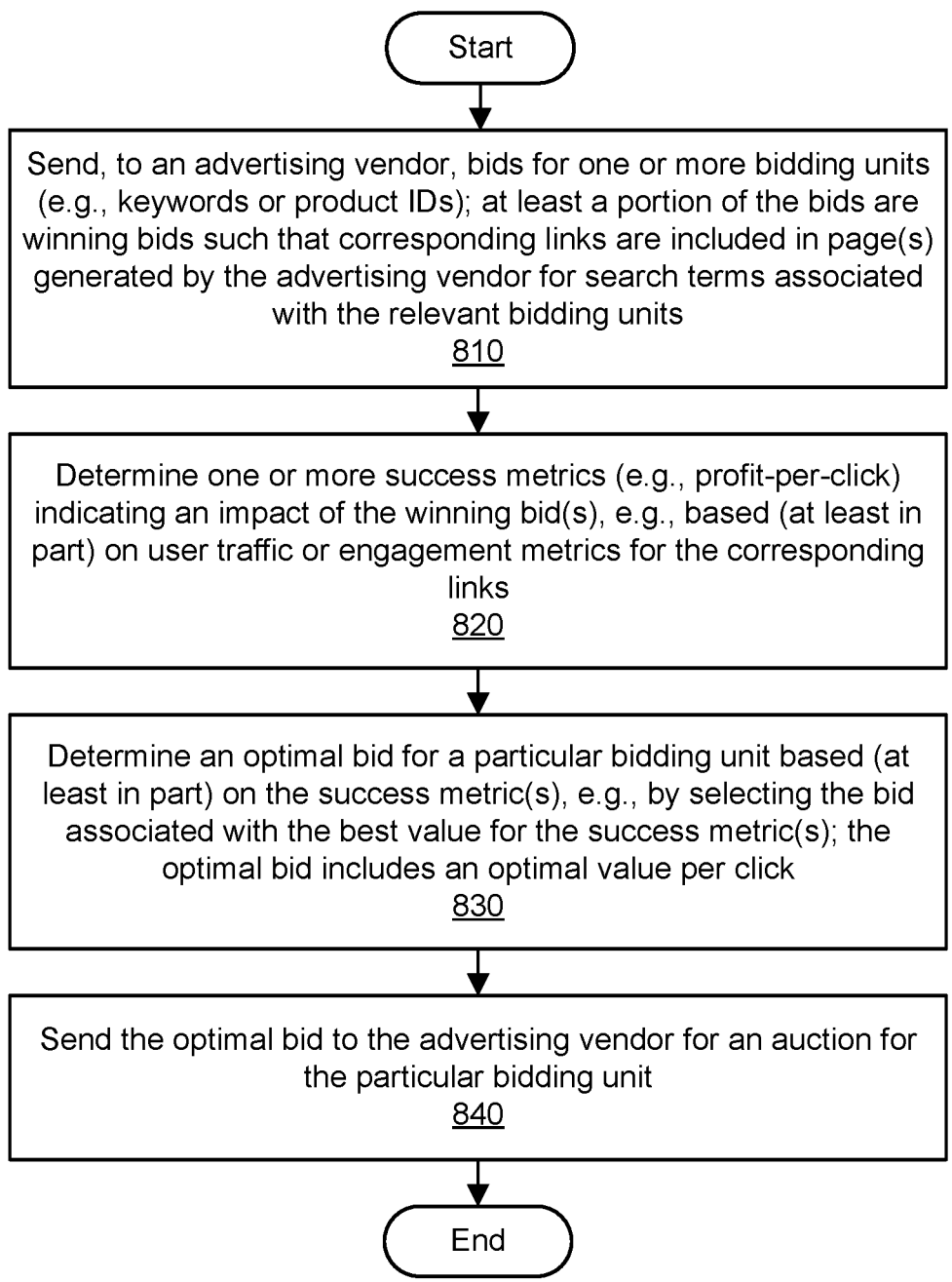
FIG. 8 is a flowchart illustrating a method for optimized management of online advertising auctions, according to some embodiments.

FIG. 8 is a flowchart illustrating a method for optimized management of online advertising auctions, according to some embodiments. As shown in 810, bids for one or more bidding units may be sent to an advertising vendor such as a search engine provider. Bidding units may include keywords, key phrases, product identifiers, and other terms for which auctions are conducted by the advertising vendor. The bids may represent exploratory bids with a range of programmatically generated bid values or historical bids with client-specified bid values. At least a portion of the bids may ultimately be winning bids in auctions conducted by the advertising vendor. For the winning bids, advertisements with links may be included in search engine results pages (SERPs) generated by a search engine provider or in other Internet-accessible pages generated (at least in part) by an advertising vendor. The pages may be generated for user-selected search terms that are associated with the bidding units. User traffic may be generated for the pages, e.g., when users click on the links in the advertisements by winning bidders.

As shown in 820, one or more success metrics may be determined that indicate the impact of the winning bid(s) for the advertiser. For example, a winning bidder may receive an impression from a search engine provider when the bidder's advertisement shows up on the resulting SERP. Impressions may be used to determine a win rate. User clicks on the link(s) may result in user traffic to a web page (or other Internet-accessible location) associated with the advertiser. User views of web pages via user traffic to the link(s) may be used to determine a click-through rate. User purchases of goods or services (or other transactions) via those web pages may be used to determine a conversion rate. Other events, such as users signing up for accounts with the advertiser, may also contribute to the success metrics. The success metric(s) may be determined based (at least in part) on user engagement metrics such as click-through rates and conversion rates. The success metric(s) may indicate an advertiser's return-on-investment for a particular bidding unit and a particular bid. For example, the success metric(s) may include profit-based metrics such as profit-per-click values for the advertiser's investment in a particular bidding unit. A profit-per-click may be determined based (at least in part) on the advertiser's cost-per-click in comparison to revenue generated per click from user purchases or user events. The success metric(s) may represent default metrics and/or client-specified metrics that are relevant to the client's investment strategy in the auctions.

As shown in 830, an optimal bid may be determined for a particular bidding unit. An optimal bid may include an optimal cost-per-click to be paid by an advertiser to the advertising vendor. An optimal bid may be determined based (at least in part) on maximizing the profit-per-click for a bidding unit. The optimal bid may be determined based (at least in part) on the success metric(s) or other auction data. For example, the optimal bid may be determined by selecting the exploratory or historical bid (cost-per-click) that resulted in the best profit-per-click. In some embodiments, an optimal bid may be determined for a particular bidding unit by applying a predictive model or other statistical methods to the exploratory or historical bids. As shown in 840, the optimal bid may be submitted to the advertising vendor for an auction for the particular bidding unit. The optimal bid may be submitted with the expectation that the bid will win an auction for the corresponding bidding unit while also improving the one or more success metrics (e.g., profit-per-click) at the advertiser.

Illustrative Computer System

In at least some embodiments, a computer system that implements a portion or all of one or more of the technologies described herein may include a computer system that includes or is configured to access one or more computer-readable media. FIG. 9 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 9 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
an auction management system comprising one or more processors and one or more memories to store computer-executable instructions that, when executed, cause the one or more processors of the auction management system to:
send a plurality of exploratory bids for a keyword or key phrase to a separate search engine provider for one or more search engine provider auctions for the keyword or key phrase, wherein an individual one of the exploratory bids comprises a value per user click associated with one or more search engine results pages generated by the search engine provider for one or more search terms comprising the keyword or key phrase, wherein at least a portion of the plurality of exploratory bids represent one or more winning bids in the one or more search engine provider auctions for the keyword or key phrase, and wherein one or more links associated with the one or more winning bids are included in the one or more search engine results pages;
determine one or more success metrics associated with the plurality of exploratory bids, wherein the one or more success metrics are determined based at least in part on analysis of user traffic to the one or more links;
select, from the plurality of exploratory bids sent to the separate search engine provider, an optimal bid for the keyword or key phrase for one or more additional search engine provider auctions, based at least in part on an optimization of the one or more success metrics associated with the plurality of exploratory bids; and
send the optimal bid for the keyword or key phrase, selected based at least in part on the optimization of the one or more success metrics, to the separate search engine provider for the one or more additional search engine provider auctions for the keyword or key phrase.

2. The system as recited in claim 1, wherein a link associated with the optimal bid is included in one or more additional search engine results pages, and wherein the one or more memories store additional computer-executable instructions that, when executed, cause the one or more processors to:
determine one or more additional success metrics associated with the optimal bid based at least in part on one or more users following the link associated with the optimal bid to a product page at an online store; and
update the optimal bid based at least in part on the one or more additional success metrics.

3. The system as recited in claim 1, wherein the one or more winning bids represent a plurality of positions for the links in the one or more search engine results pages, and wherein the one or more success metrics are determined based at least in part on the plurality of positions.

4. The system as recited in claim 1, wherein the plurality of exploratory bids for the keyword or key phrase are associated with different times, and wherein the optimal bid for the keyword or key phrase is determined for a particular time.

5. A method, comprising:
sending, by an auction management system to a separate advertising vendor, a plurality of bids for one or more bidding units of the separate advertising vendor, wherein an individual one of the bids for an individual one of the one or more bidding units comprises a value per click associated with one or more pages, wherein at least a portion of the plurality of bids represent one or more winning bids in one or more auctions for the one or more bidding units, and wherein one or more links associated with the one or more winning bids are included in the one or more pages;
determining, by the auction management system, one or more success metrics associated with the plurality of bids sent to the separate advertising vendor, wherein the one or more success metrics are determined based at least in part on user traffic associated with the one or more links;
determining, by the auction management system, an optimal bid for a particular bidding unit of the separate advertising vendor based at least in part on the one or more success metrics associated with the plurality of bids sent to the separate advertising vendor; and
sending, by the auction management system to the separate advertising vendor, the optimal bid for the particular bidding unit of the separate advertising vendor that was determined based at least in part on the one or more success metrics associated with the plurality of bids sent to the separate advertising vendor.

6. The method as recited in claim 5, wherein determining the optimal bid further comprises:
selecting the optimal bid from the plurality of bids for the one or more bidding units based at least in part on a similarity of the particular bidding unit to one or more of the bidding units.

7. The method as recited in claim 6, wherein the similarity of the particular bidding unit to the one or more of the bidding units is determined using a machine learning model, wherein the machine learning model is trained using interaction data of a plurality of users with an online store.

8. The method as recited in claim 5, wherein the plurality of bids for the one or more bidding units comprise a plurality of historical bids for the particular bidding unit.

9. The method as recited in claim 5, wherein the one or more winning bids represent a plurality of positions for the links in the one or more pages, and wherein the one or more success metrics are determined based at least in part on the plurality of positions.

10. The method as recited in claim 5, wherein the optimal bid is determined for a first client, wherein the one or more success metrics associated with the plurality of bids are determined for one or more additional clients, and wherein the one or more success metrics associated with the plurality of bids are obtained on behalf of the first client from marketplace network-accessible store.

11. The method as recited in claim 5, wherein the plurality of bids for the one or more bidding units are associated with different times, wherein the optimal bid for the particular bidding unit is determined for a particular time, and wherein the optimal bid for the particular bidding unit at the particular time differs for an optimal bid for the particular bidding unit at a different time.

12. The method as recited in claim 5, further comprising:
generating, by the auction management system, a graph-based visualization indicating one or more relationships of the particular bidding unit to the one or more success metrics.

13. The method as recited in claim 5, further comprising:
simulating, by the auction management system, the one or more auctions for the one or more bidding units; and
determining, by the auction management system, a plurality of additional bids based at least in part on the simulating.

14. The method as recited in claim 5, wherein the auction management system is hosted by a provider network and Internet-accessible by a plurality of clients via a service interface, and wherein the provider network offers a plurality of services including the auction management system.

15. One or more non-transitory computer-readable storage media storing program instructions that, when executed on or across one or more processors, perform:
sending, by an auction management system to a separate search engine provider, a plurality of bids for one or more search engine provider auctions for one or more keywords or key phrases, wherein an individual one of the bids for an individual one of the one or more keywords or key phrases comprises a value per click associated with one or more search engine results pages generated by the search engine provider for one or more search terms comprising the individual one of the one or more keywords or key phrases, wherein at least a portion of the plurality of bids represent one or more winning bids in the one or more search engine provider auctions for the one or more keywords or key phrases, and wherein one or more links associated with the one or more winning bids are included in the one or more search engine results pages;
determining, by the auction management system, one or more success metrics associated with the plurality of bids sent to the separate search engine provider, wherein the one or more success metrics are determined based at least in part on one or more engagement rates associated with the one or more winning bids;
determining, by the auction management system, an optimal bid for a particular keyword or key phrase for one or more additional search engine provider auctions based at least in part on the one or more success metrics associated with the plurality of bids; and
sending, by the auction management system to the separate search engine provider, the optimal bid for the particular keyword or key phrase for the one or more additional search engine provider auctions, wherein the optimal bid was determined based at least in part on the one or more success metrics associated with the plurality of bids sent to the separate search engine provider.

16. The one or more non-transitory computer-readable storage media as recited in claim 15, further comprising additional program instructions that, when executed on or across the one or more processors, perform:
selecting the optimal bid from the plurality of bids for the one or more keywords or key phrases based at least in part on a similarity of the particular keyword or key phrase to one or more of the keywords or key phrases.

17. The one or more non-transitory computer-readable storage media as recited in claim 15, wherein the one or more winning bids represent a plurality of positions for the links in the one or more search engine results pages, and wherein the one or more metrics are determined based at least in part on the plurality of positions.

18. The one or more non-transitory computer-readable storage media as recited in claim 15, wherein the plurality of bids for the one or more keywords or key phrases are associated with different times, wherein the optimal bid for the particular keyword or key phrase is determined for a particular time, and wherein the optimal bid for the particular keyword or key phrase at the particular time differs for an optimal bid for the particular keyword or key phrase at a different time.

19. The one or more non-transitory computer-readable storage media as recited in claim 15, further comprising additional program instructions that, when executed on or across the one or more processors, perform:
   performing, by the auction management system, one or more auction experiments based at least in part on a graph representing relationships among a plurality of bidding units.

20. The one or more non-transitory computer-readable storage media as recited in claim 15, wherein the one or more links represent one or more product pages at an online store.

* * * * *